(12) United States Patent
Wargh et al.

(10) Patent No.: US 8,746,385 B2
(45) Date of Patent: Jun. 10, 2014

(54) HUB UNIT AND A POWERTRAIN FOR A VEHICLE

(71) Applicant: Volvo Construction Equipment AB, Eskilstuna (SE)

(72) Inventors: Christian Wargh, Eskilstuna (SE); Mats Åkerblom, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 13/897,380

(22) Filed: May 18, 2013

(65) Prior Publication Data

US 2013/0252775 A1    Sep. 26, 2013

Related U.S. Application Data

(62) Division of application No. 12/518,100, filed as application No. PCT/SE2006/001393 on Dec. 6, 2006, now Pat. No. 8,505,658.

(51) Int. Cl.
    *B60K 7/00*    (2006.01)

(52) U.S. Cl.
    USPC ..................... 180/65.51; 180/65.6

(58) Field of Classification Search
    USPC ............ 180/65.1, 65.51, 65.6, 65.7; 475/151, 475/317
    See application file for complete search history.

(56) References Cited

U.S. PATENT DOCUMENTS

| | | | | |
|---|---|---|---|---|
| 4,330,045 A * | 5/1982 | Myers | ..................... | 180/65.51 |
| 4,406,340 A * | 9/1983 | Gennaux | ..................... | 180/65.51 |
| 4,418,777 A * | 12/1983 | Stockton | ..................... | 180/65.6 |
| 5,813,488 A * | 9/1998 | Weiss | ..................... | 180/65.6 |
| 6,358,173 B1 * | 3/2002 | Klemen et al. | ..................... | 475/5 |
| 6,358,176 B1 * | 3/2002 | Nauheimer et al. | ..................... | 475/149 |
| 6,688,412 B2 * | 2/2004 | Kima et al. | ..................... | 180/65.51 |
| 7,527,113 B2 * | 5/2009 | Jenkins | ..................... | 180/65.51 |
| 2003/0130082 A1 * | 7/2003 | Janson | ..................... | 475/317 |

* cited by examiner

*Primary Examiner* — Frank Vanaman
(74) *Attorney, Agent, or Firm* — WRB-IP LLP

(57) ABSTRACT

A hub unit includes an electric machine adapted for driving a wheel. The hub unit includes at least two planetary gears coupled in series between the electric machine and a wheel hub, and a gear shifting device for connecting and disconnecting, respectively, one of the planetary gears from being drivingly connected to the electric machine.

8 Claims, 12 Drawing Sheets

HUB UNIT AND A POWERTRAIN FOR A VEHICLE

BACKGROUND AND SUMMARY

Figure 1:
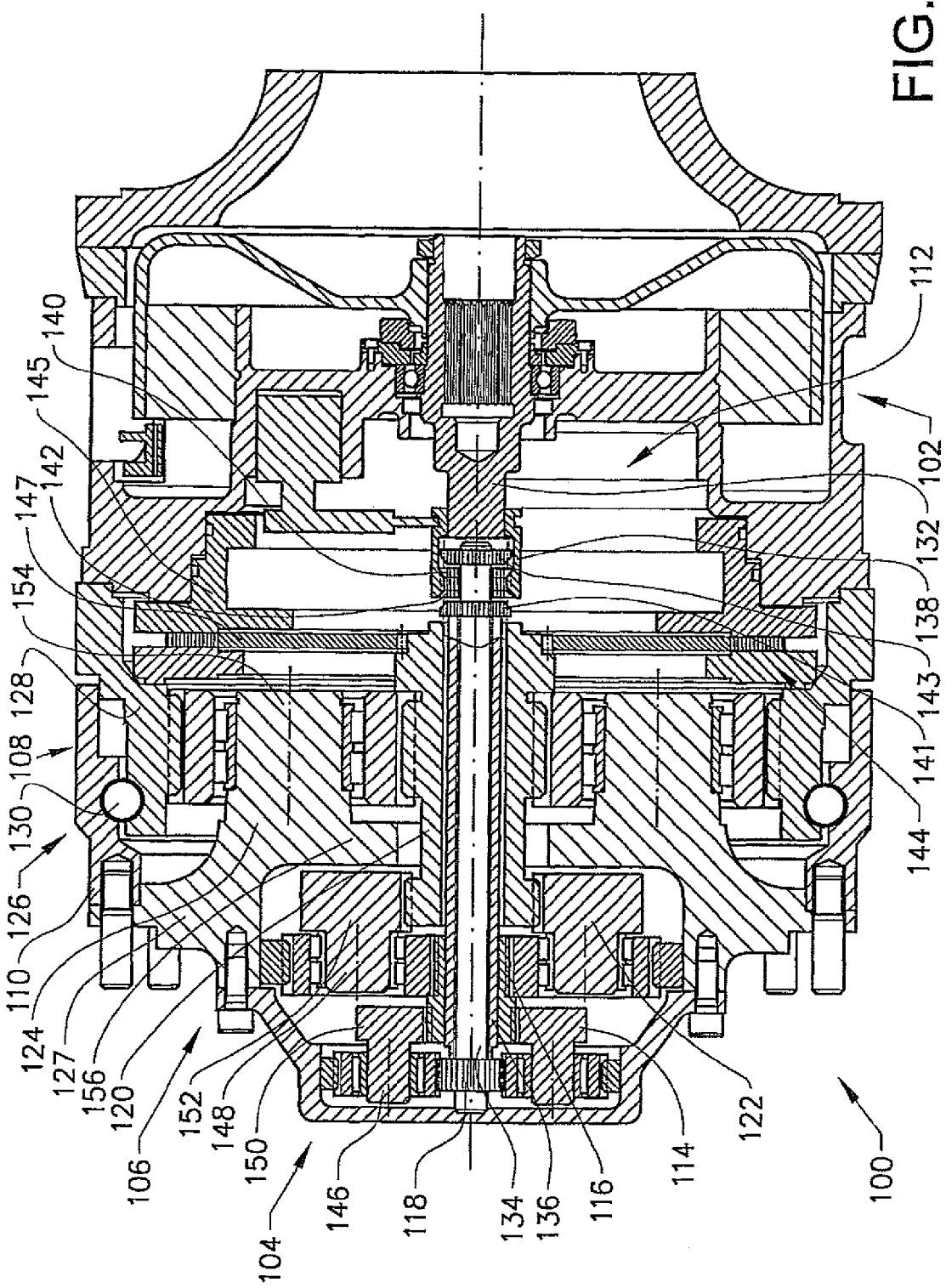

The present application is a divisional of U.S. application Ser. No. 12/518,100, filed Jun. 6, 2009, which is the U.S. national stage of International Application PCT/SE2006/001393, filed Dec. 6, 2004, both of which are incorporated by reference.

The present invention relates to a hub unit comprising an electric machine adapted for driving a wheel. The invention is further directed to a heavy vehicle and a work machine comprising such a hub unit.

The term heavy vehicle comprises different types of commercial transportation vehicles, such as trucks, buses and work machines. The term work machine comprises different types of material handling vehicles like construction machines, such as a wheel loader, an articulated hauler, a backhoe loader, a motor grader and an excavator. The invention will be described below in a case in which it is applied in a wheel loader. This is to be regarded only as an example of a preferred application.

A hub unit of a work machine normally comprises a so-called final drive, or hub-mounted reduction gear. The wheel is arranged rotationally rigidly on a hub and a planetary gear set is connected between a transverse drive shaft and the hub. The transverse drive shaft is driven by an angular gear, or center gear, which is in turn driven by an internal combustion engine (a diesel engine) by way of a transmission system. Arranging a planetary gear set on each drive wheel in this way produces a reduction in rotational speed from the transverse drive shall to the hub and an increase in torque from the transverse drive shaft to the hub.

Increasing energy prices and reduced access to oil will in the future lead to an increasing; demand in propelling vehicles by means of electricity. A vehicle comprising hub units provided with an electric machine at each wheel is known. The vehicle comprises an electric power generating means, which is connected to the electric machines in the hub units for supplying power to the electric machines The electric power generating means may comprise an internal combustion engine (for example a diesel engine) and a generator for generating electric energy. By arranging an electric machine at each wheel, rotation of the wheels may be controlled individually. Further, a mechanical driveline connecting the internal combustion engine and the wheels may be dispensed with.

It is desirable to achieve a hub unit comprising an electric machine and a reduction gear, and which is adapted for a work machine operation. A further aim of the invention is to create conditions for a compact design in an axial direction in order to fit into a wheel hub.

According to an aspect of the present invention, the hub unit comprises at least two planetary gears coupled in series between the electric machine and a wheel hub, and a gear shifting device for connecting and disconnecting, respectively, one of said planetary gears from being drivingly connected to the electric machine.

The planetary gears are configured in order to adapt the input torque and the wheel speed. Each planetary gear preferably comprises one sun gear, one ring: gear, one planet carrier and a plurality of planet wheels rotationally supported on the planet carrier and in engagement with the sun gear and the ring gear.

By virtue of the gear shifting device, it is possible to shift gears between high and low gears. This is advantageous when using electric machines which have limited maximum rotation speeds, for example 4000 rpm. This maximum rotation speed would, according to a specific design of the planetary gear sets, correspond to a maximum speed of 10 km/h of the machine. Thanks to the gear shifting device, one of the planetary gear sets is disconnected and the maximum speed of the machine is substantially increased.

In other words, the gear shifting device is adapted to bypass one of said planetary gears in the power transmission path from the electric machine to the wheel hub when it is in the disconnected state.

Preferably, a sun gear forms an input to each planetary gear and a planet carrier forms an output from each planetary gear.

According to a preferred embodiment of the invention, a planetary gear member forms a planet carrier in an upstream planetary gear and a sun gear in a downstream planetary gear. Thus, the planet carrier in the upstream planetary gear and the sun gear in the downstream planetary gear rotates with equal speed. The planetary gear member may be formed in a one-piece unit or assembled by a plurality of parts.

According to a further preferred embodiment of the invention, the hub unit comprises three planetary gears coupled in series between the electric machine and the wheel hub. In this way, an output speed of the electric machine is reduced to a suitable wheel speed for the operation of the work machine.

According to a further preferred embodiment of the invention, an upstream planetary gear is arranged axially outwards of a downstream planetary gear. The wording "upstream" is defined referring to the power transmission path from the electric machine to the wheel hub. Preferably, the electric machine is arranged axially inwards of the series of planetary gears. Thus, the power transmission path extends from the electric machine axially outwards to the upstream planetary gear and then axially inwards to the downstream planetary gear. This configuration of he planetary gears creates conditions for a compact hub unit in the axial direction.

According to a farther development of the last-mentioned embodiment, a planet carrier body in a last planetary gear in the series comprises a portion that extends radially outside an upstream planetary gear and is adapted to be rotationally rigidly connected to the wheel hub. Such a configuration creates conditions for an even more compact hub unit in the axial direction. Preferably, for the embodiment with three planetary gears in series, a planet carrier in each of a first planetary gear and a second planetary gear in the series is positioned so that a planet wheel supporting pin extends from a planet carrier body in an axially outwards direction, and that a planet carrier in a third planetary gear in the series is positioned so that a planet wheel supporting pin extends from a planet carrier body in an axially inwards direction. This configuration is especially advantageous with regard to being compact in the axial direction.

Further preferred embodiments will be apparent from the following description and drawings.

BRIEF DESCRIPTION OP THE DRAWINGS

Figure 2:
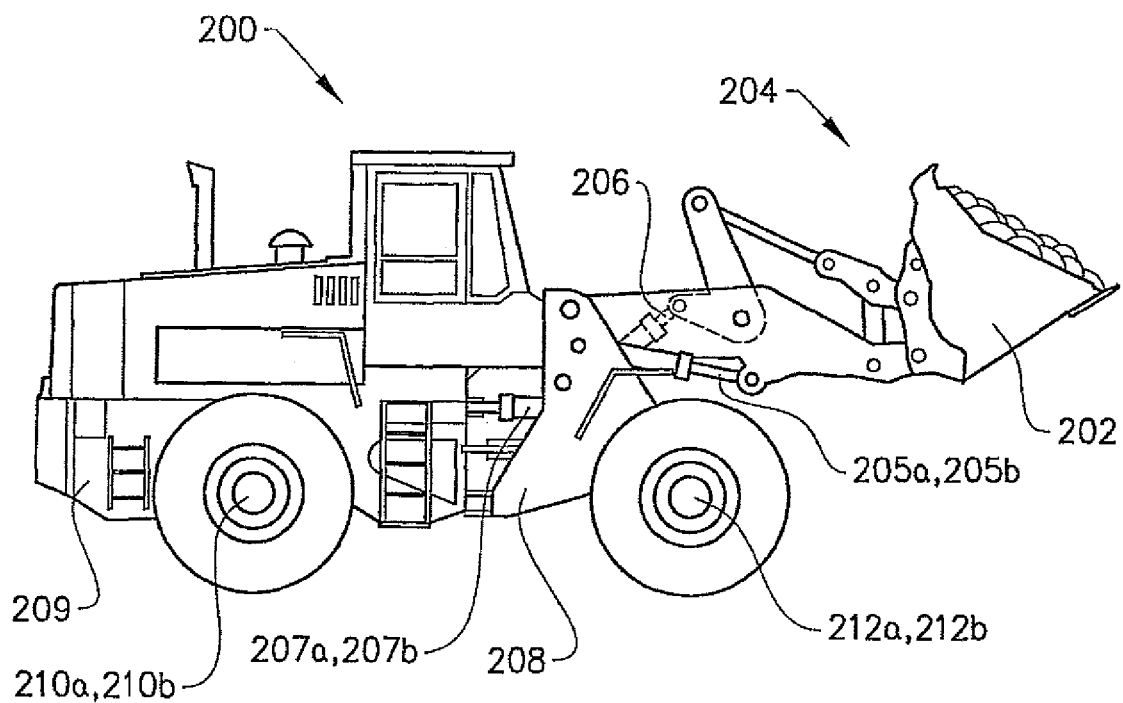
Figure 3:
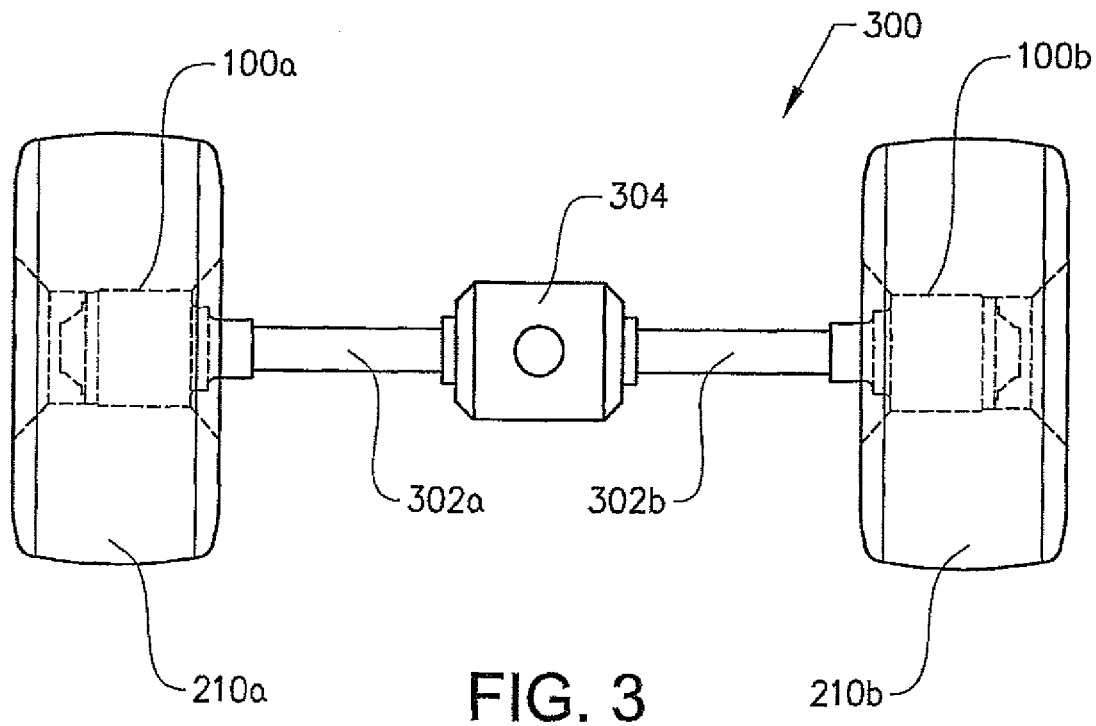
Figure 4:
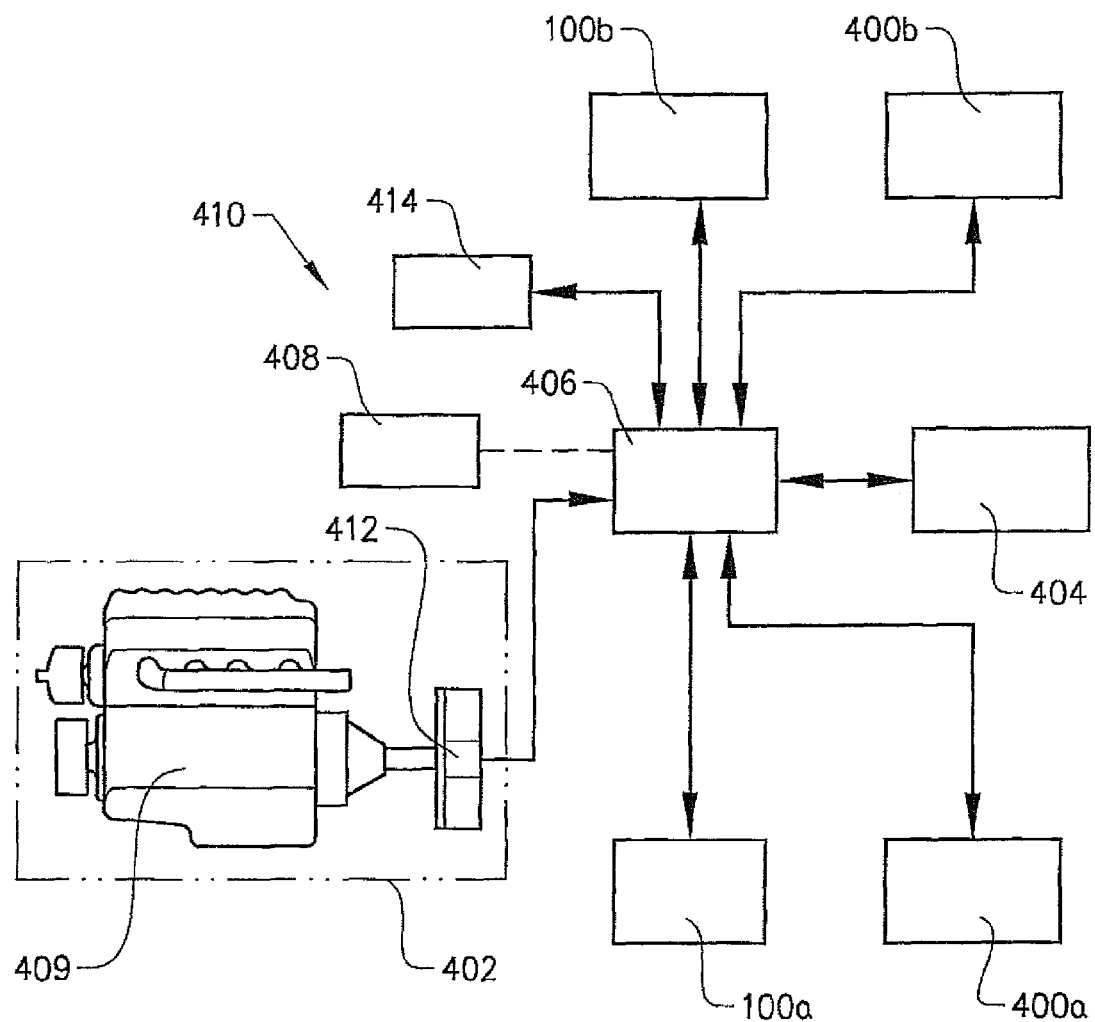
Figure 5:
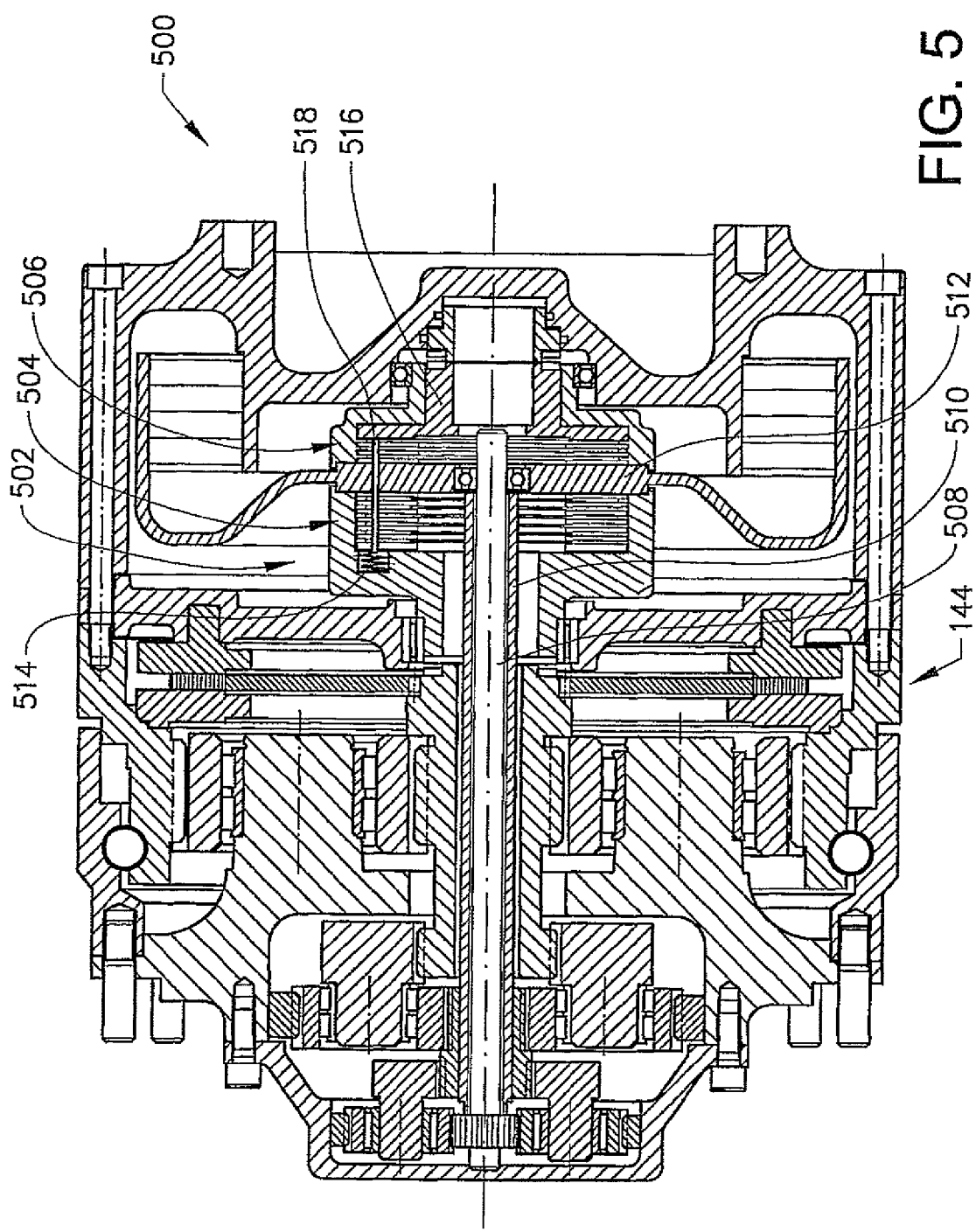

The invention will be explained, below, with reference to the embodiments shown on the appended drawings, wherein FIG. 1 shows a hub unit according to a first embodiment in a cut view, FIG. 2 schematically shows a wheel loader in a side view, FIG. 3 shows an axle of the wheel loader, FIG. 4 shows a system for power distribution in the wheel loader, FIG. 5 shows a hub unit according to a second embodiment in a cut view, and FIG. 6-13 show a hub unit in schematic cut views according to further embodiments.

DETAILED DESCRIPTION

FIG. 1 shows a hub unit 100 comprising an electric machine 102 adapted for producing an input power in order to chive a wheel. The hub unit comprises at least two planetary gears 104,106,108 coupled in series between the electric machine 102 and a wheel hub 110. The electric machine 102 is arranged axially inwards of the series of planetary gears 104,106,108. The hub unit 100 further comprises a gear shifting device 112 for connecting and disconnecting, respectively, one of said planetary gears 104 from being drivingly connected between the electric machine 102 and the wheel hub 110.

More specifically, the hub unit 100 comprises three planetary gears 104,106,108 coupled in series between the electric machine 102 and the wheel hub 110. Reference will first be made to an upstream (first) planetary gear 104 and a downstream (second) planetary gear 106 in the planetary gear series. The terms "upstream" and "downstream" are defined referring to the power transmission path from the electric, machine 102 to the wheel hub 110.

A planet carrier 114 in the upstream planetary gear 104 is rotationally rigidly connected to a sun gear 116 in the downstream planetary gear 106. In other words, a planetary gear member 114, 116 forms the planet carrier 114 in the upstream planetary gear and the sun gear 116 in the downstream planetary gear.

The upstream planetary gear 104 is arranged axially outwards of the downstream planetary gear 106. In the preferred embodiment in FIG. 1, the electric machine 102 is arranged axially inwards of the series of planetary gears 104,106,108. Thus, the power transmission path extends from the electric machine 102 axially outwards to the upstream planetary gear 104 and then axially inwards to the downstream planetary gears 306,108. Further, a Still gear 116,118,120 forms an input to each planetary gear 104,106,108 and a planet carrier 114,122,124 forms an output from each planetary gear 104, 106,108.

The wheel hub 110 is rotationally rigidly connected to the planet carrier 124 in the last planetary gear 108 in the series, wherein the wheel hub 110 and the planet carrier form a structure rotating at wheel speed.

A bearing arrangement 126 rotatably support the wheel hub 110. A ring gear 128 in the last planetary gear 108 in the series is stationary. The wheel hub and planet carrier structure 110,124 rotating at wheel speed is mounted in the bearing arrangement 126 relative to the r gear 128. More specifically, the structure 110,124 rotating at wheel speed is mounted in the bearing arrangement 126 radially outside the ring gear 128. The bearing, arrangement 126 comprises at least one row of balls 130 arranged between races in opposite portions of the structure 110,124 rotating at wheel speed and the ring gear 128.

The gear shifting device 112 is adapted for connecting and disconnecting, respectively, the upstream (first) planetary gear 104 from being drivingly connected to the wheel hub 110. The gear shifting device 112 is adapted to selectively drivingly connect the sun wheel 118 in the upstream (first) planetary gear 104 and the sun wheel 116 of the downstream planetary (second) gear 106 to a drive shaft 132 adapted to transmit power from the electric machine 102.

A first drive shaft 134 is rotationally rigidly connected to the sun gear 118 in the first planetary gear 104 in the series. A second shaft 136, which is arranged co-axially with the first shaft 134, is rotationally rigidly connected to the sun gear 116 in the second planetary gear 106 in the series. The gear shifting device 112 comprises means 138 for selectively drivingly connect one of said first and second shaft 134,136 to the drive shaft 132 adapted to transmit power from the electric machine 102. The connection means 138 of the gear shifting device 112 comprises a shift sleeve, which is displaceable in an axial direction and comprises portions 140,142 for engaging one of said first and second shaft 134,136 at a time. Each of the first and second shaft 134,136 comprises a correspondingly configured engagement portion 141,143 in the form of a flange with splines or other engaging structure. The splined flanges 141,143 of the first and second shaft 134,136 is arranged at an axial distance from each other and the shift sleeve is arranged between the splined flanges for engagement with the first shaft 134 in a retracted position and the second shaft 136 in a forwarded position.

The hub unit 100 comprises a brake 144. The brake 144 is adapted to brake the sun gear 120 in the last planetary gear 108. The brake 144 is formed by a wet disc brake. The brake comprises a brake disc 147 which is rotationally rigidly connected to the sun gear 120. The brake 144 further comprises an actuation means 145 in the form of a piston for engaging the brake disc 147 and a return spring member. The brake forms an emergency brake and/or an auxiliary brake (the main brake function is achieved via the electric machine).

A planet carrier 114,122 in an upstream planetary gear, see the first and second planetary gears 104,106, is positioned so that a planet wheel supporting pin 146,148 extends from a planet carrier body 150,152 in an axially outwards direction. On the other hand, the planet carrier 124 in the third and last (downstream) planetary gear 108 is positioned so that a planet wheel supporting pin 154 extends from a planet carrier body 156 in an axially inwards direction, towards the electric machine 102.

The planet carrier 124 in the third (and last) planetary gear 108 in the series comprises a portion 127 that extends radially outside the second (upstream) planetary gear 106 and is adapted to be rotationally rigidly connected to the wheel hub 110 (via a bolt connection).

FIG. 2 discloses a frame-steered work machine in the form of a wheel loader 200 having an implement 202 in the form of a bucket. The bucket 202 is arranged on a load arm unit 204 for lifting and lowering the bucket 202, and further the bucket 202 can be tilted or pivoted relative to the arm unit 204. The wheel loader 200 is provided with a hydraulic system comprising at least one hydraulic pump (not shown) and working cylinders 205a, 205b *f* 206 for the operation of the arm unit 204 and the bucket 202. Furthermore, the hydraulic system comprises working cylinders 207a, 207b for turning the wheel loader by means of relative movement of a front body 208 and a rear body 209. In the embodiment illustrated in FIG. 2, two working cylinders known as lifting cylinders 205a, 205b are arranged for lifting and lowering the arm unit 204, and a further working cylinder known as tilting cylinder 206 is arranged for tilting-in or tilting-out the bucket 202 relative to the arm unit 204. In addition, two working cylinders known as the steering cylinders 207a, 207b are arranged for steering the wheel loader 200.

The wheel loader comprises a plurality of driving wheels 210a, 210b, 212a, 212b. The above described hub unit. 100 is arranged at each of said driving wheels 210a, 210b, 212a, 212b for individually driving each wheel.

FIG. 3 schematically discloses a wheel axle 300 of the wheel loader 200. A pair of interconnected transverse drive shafts 302a, 302b extends in opposite directions, each of which drives one of said wheels 210a, 210b. A hub unit 100a, 100b is indicated at each wheel 210a, 210b. A clutch 304 is adapted to engage and disengage, respectively the transverse drive shafts 302a, 302b to being rotationally rigidly connected to each other. Thus, the hub units 210a, 210b at opposite wheels are interconnected via the transverse drive shafts 302a, 302b. In this way, one of the hub units 100a can support the other hub unit 100b in providing power for driving its associated wheel 210b. This may be useful in extreme situations where the first wheel 210a has no grip (i.e free slip) and the other wheel 210b has a firm grip (i.e no or little slip). In such a situation, the wheel 210b with a firm grip may be able to transmit more torque than the associated hub unit 100b can supply. The first hub unit 100a can then be controlled to supply the excess torque.

FIG. 4 schematically discloses a control system 410 of the work machine 200. The control system 410 comprises an electric power generating means 402, which is connected to the electric machines in the hub units 100a, 100b, 400a, 400b fin supplying power to the electric machines. The control system 410 further comprises an electric energy storage means 404, which is connected to the electric machines in the hub units 100a, 100b, 400a, 400b for an exchange of electric energy. A control unit 408 is arranged for controlling operation of the power communication to and from the electric machines in the hub units 100a, 100b, 400a, 400b via a an intersection 406.

The electric power generating means 402 comprises an internal combustion engine 409 provided with an electric generator 412. Within the scope of the invention, the electric power generating means 200 can be designed in many different ways as long as it is able to provide electricity. One option is to use a fuel cell for providing, electricity. Another example is to use a gas turbine provided with an electric generator.

The electric energy storage means 404 is adapted for storing, energy from the electric power generating means 402 and/or from the electric machines in the hub units 100a, 100b, 400a, 400b. This electric energy storage means 404 is then used to provide electricity to the electric machines in the hub units 100a, 100b, 400a, 400b.

A hydraulic system 414 comprising further electric machines (not shown) for driving pumps is operatively connected to the power generating means 402. The control unit 408 is configured for controlling an exchange of electric energy between the electric machines 100a, 100b, 400a, 400b, the hydraulic system 414 and the electric energy storage means 404. For example, energy may be recuperated by the electric machines 100a, 100b, 400a, 400b during retardation, and by the hydraulic system 414 during lowering and retarding a load. The recuperated energy may be stored in the electric energy storage means 404 for use in a later acceleration or lifting action.

A second embodiment of the hub unit 500 is shown in FIG. 5. The second embodiment of the hub unit 500 differs from the first embodiment of the hub unit 100 in the design of the gear shifting device 502. The gear shifting device 502 comprises connection means in the form of two sets of clutch discs 504, 506, which are adapted for engaging one of said first shaft 508 and second shaft 510 at a time.

The first clutch disc set 504 comprises at least one rotation disc, which is rotationally rigidly connected to the second shaft 510 and the second clutch disc set 506 comprises at least one rotation disc, which is rotationally rigidly connected to the first shaft 508.

The electric machine 502 comprises a rotor 512. The clutch disc sets 504,506 are arranged on opposite sides of the rotor 512 for engaging the rotor one at a time A spring member 514 is adapted to effect the first disc set 504 for engagement with the rotor 512. A brake actuating means in the form of a piston 516 is arranged for compressing the second disc set 506 for engagement with the rotor. Further, a force transmitting member 518 in the form of at least one rigid rod is operatively arranged between the brake actuating means 516 and the spring member 514 such that the spring effected disc set is released when the other disc set is in a compressed state. Preferably, a plurality of circumferentially spaced rods is arranged between the brake actuating means 516 and the spring member 514.

Figure 6:
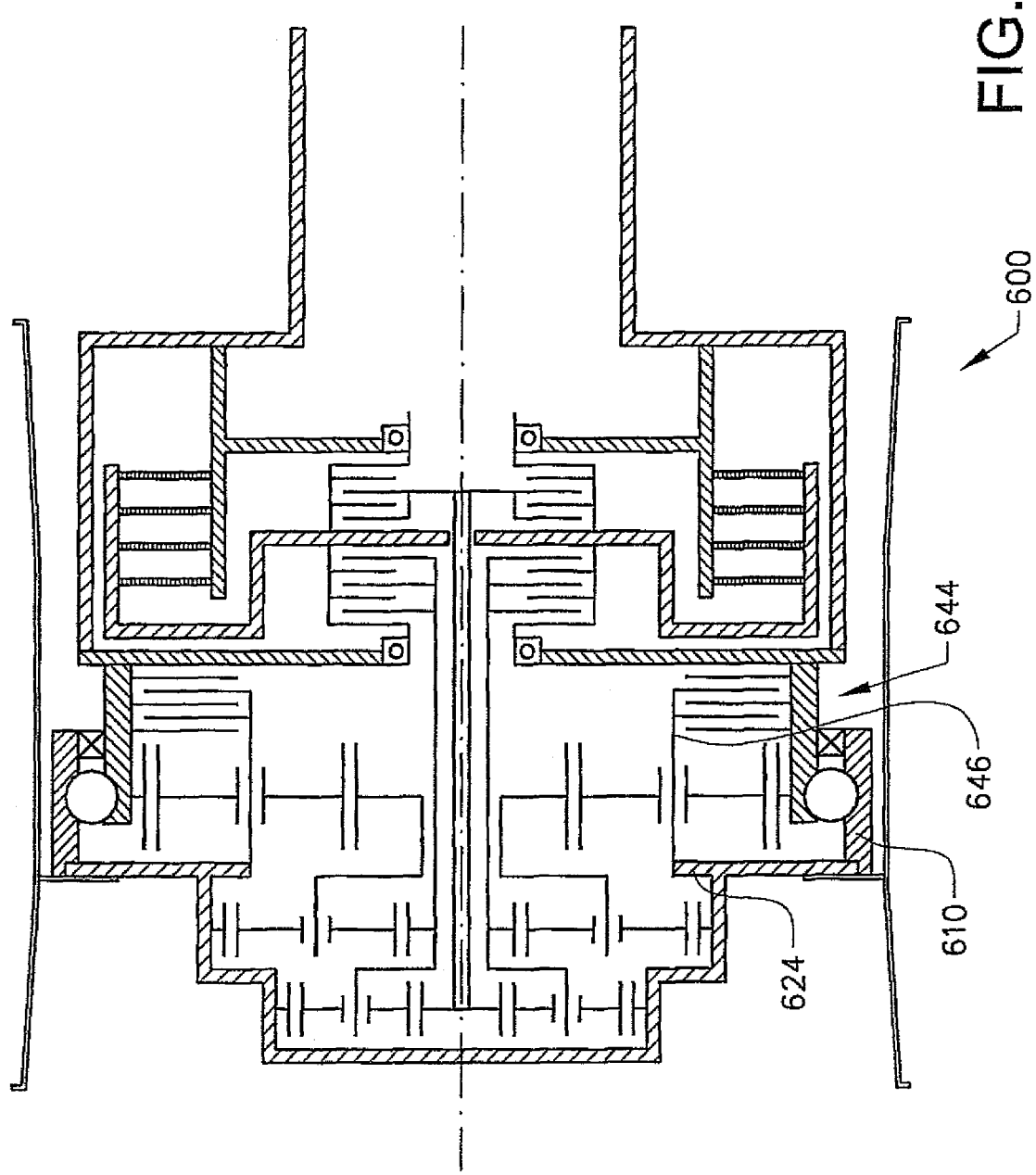

A third embodiment of the hub unit 600 is shown in FIG. 6. The third embodiment of the hub unit 600 differs from the second embodiment of the hub unit 500 in that the wet disc brake 644 is adapted to brake a part 624 rotating at wheel speed instead of the sun gear 120 in the last planetary gear. More specifically, the wheel speed part 624 is rotationally rigidly connected to the wheel hub 610. More particularly, the wheel speed part 624 forms part of the planet carrier in the last planetary gear step. A planet wheel supporting pin 646 extends from a planet carrier body in the axial direction and the wet disc brake is positioned on an opposite side of the planet wheel relative to the planet carrier body. The wet disc brake is adapted to engage with the axially extending planet wheel supporting pin 646 in order to brake the rotation of the planet carrier 624 and thereby also the wheel hub 610.

The brake 644 comprises a first set of brake discs, which are rotationally rigidly connected to the planet wheel supporting pin 646, and a second set of brake discs, which are arranged rotationally rigidly connected to a stationary housing, in the form of an axle housing. The brake discs in the second set consequently consist of or comprise so-called stationary discs. The brake discs are arranged so that every other brake disc forms part of the first set and every second brake disc forms part of the second set. The brake discs in the first set are displaceable along the planet wheel supporting pin 646 in the axial direction. The brake discs in the second set are arranged in the housing so that they are also displaceable in the axial direction.

Figure 7:
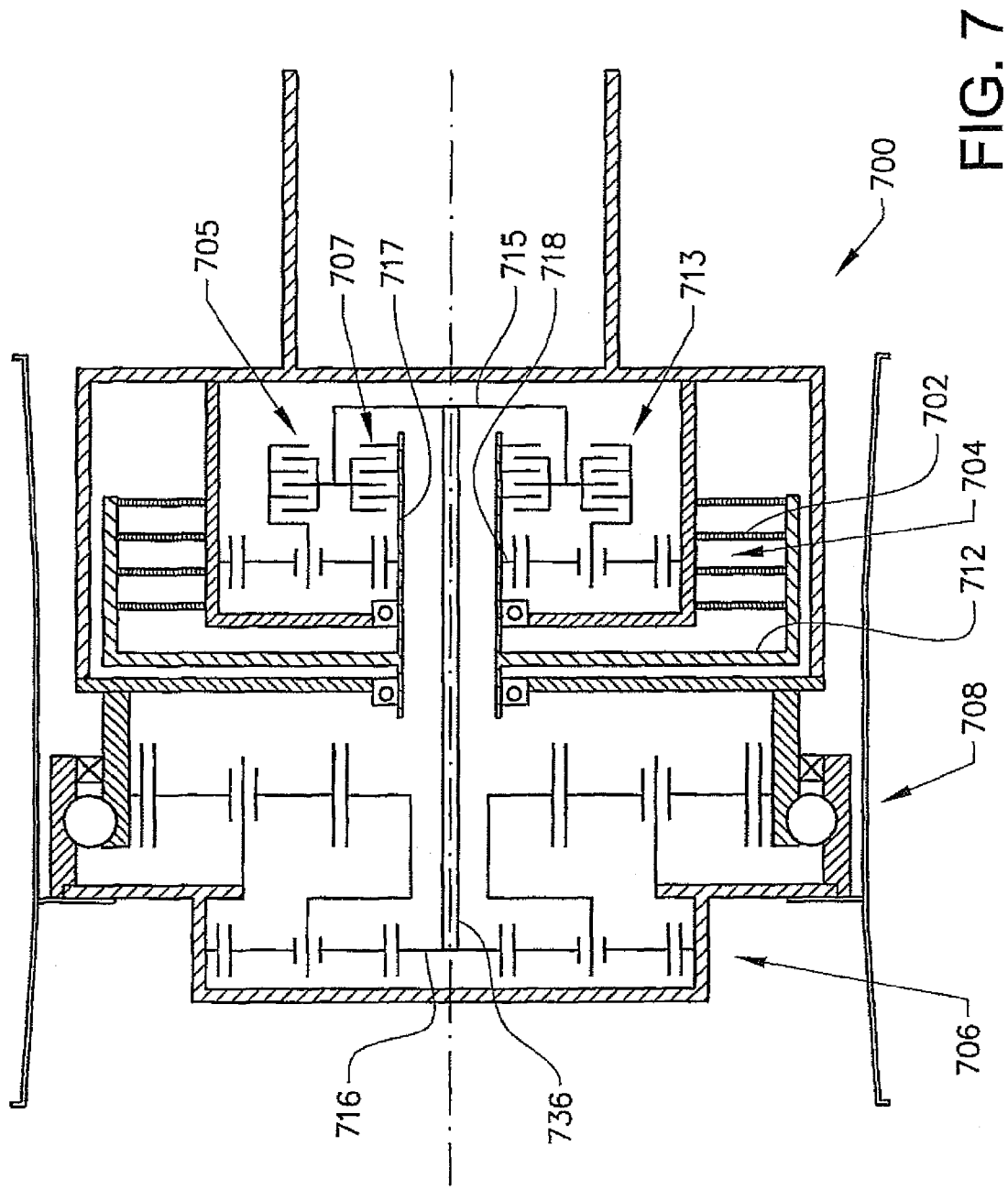

A fourth embodiment of the hub unit 700 is shown in FIG. 7. The first planetary gear 704 is arranged inside the second and third planetary gears 706,708 in the axial direction. More specifically, the first planetary gear 704 is arranged inside a casing of the electric machine 702. A rotor 712 of the electric machine 702 is rotationally rigidly connected to a sun wheel 718 of the first planetary gear 704 via a tubular shaft 717 which is co-axial with a drive shaft 736 connected to the second planetary gear 706.

A gear shifting device 713 is adapted to connect and disconnect, respectively the first planetary gear 704 from being drivingly connected to the electric machine. More specifically, the gear shifting device 713 is adapted to connect and disconnect, respectively an output of the first planetary gear 704 to the drive shaft 736, which is adapted to drive a sun wheel 716 in the second planetary gear 706. Said output of the first planetary gear 704 is formed by the planet carrier.

The gear shifting device 713 comprises connection means in the form of two sets of clutch discs 705,707, which are adapted for rotationally connecting one of said planet carrier a the tubular shaft 717 at a time to the drive shaft 736. In this way, a low gear is achieved when a first set of clutch discs 705 connects the planet carrier to the sun gear 716 of the second planetary gear (via the drive shaft 736). A high gear is achieved when a second set of clutch discs 707 connects the rotor 712 of the electric machine 702 via the sun gear 718 to the sun gear 716 of the second planetary gear the drive shaft 736). More specifically, the gear shifting device 713 comprises a disc carrier 715, which is rotationally rigidly connected to the drive shaft 736 and carries two sets of clutch discs, wherein each one of these clutch disc sets forms part of the sets of clutch discs 705,707.

One advantage with positioning the first planetary gear 704 in direct vicinity of the electric machine 702 is that the inner drive shaft 736 will rotate at a comparatively low speed when the high gear is engaged. This leads to an increased efficiency with regard to losses, that the associated bearings are less subjected to stresses and to a good controllability of the clutch.

A further advantage associated with the fourth embodiment of the hub unit 700 is that positioning the first planetary gear 704 inside a casing of the electric machine 702 creates conditions for a more compact design.

Figure 8:
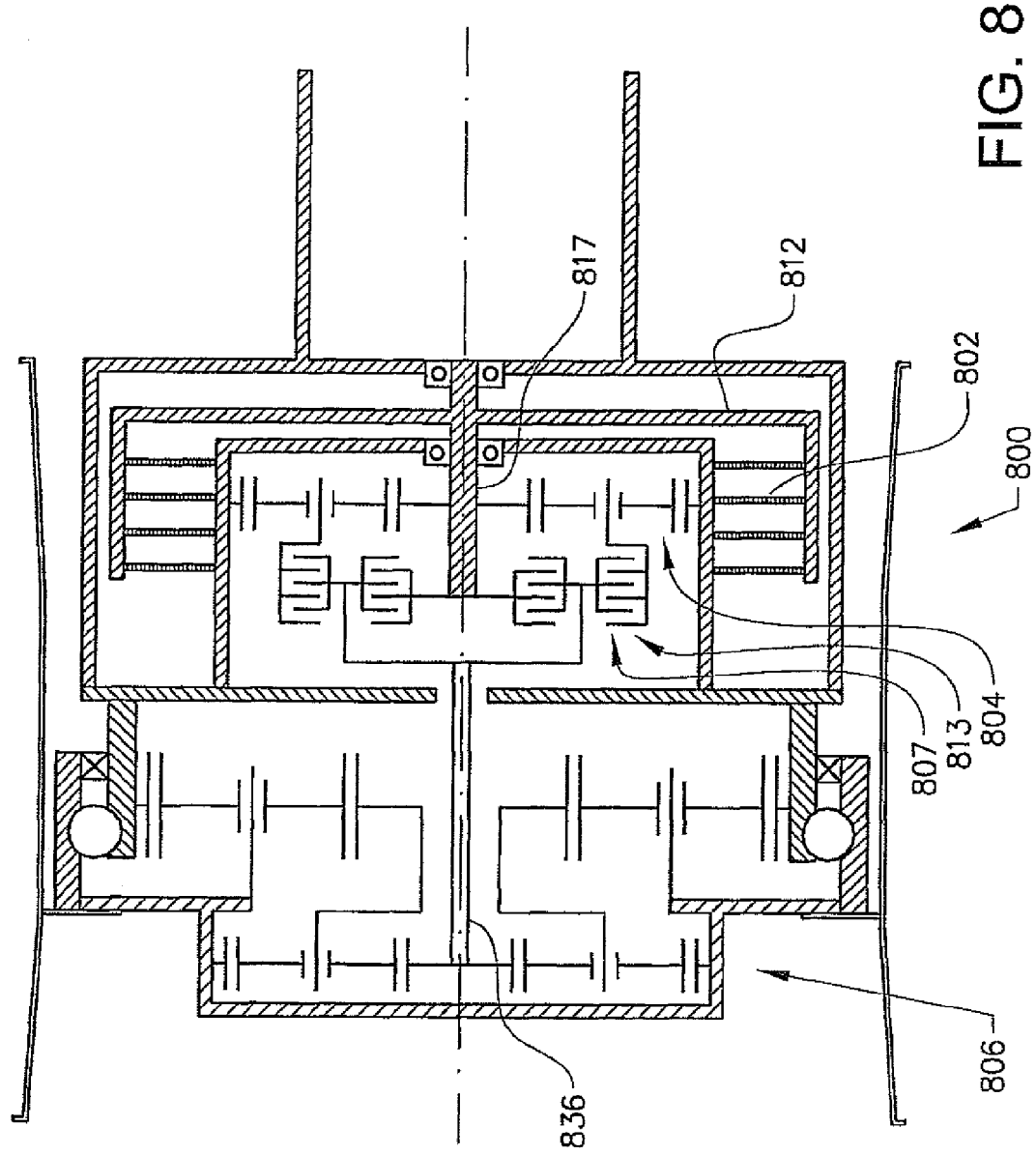

A fifth embodiment of the hub unit 800 is shown in FIG. 8. The fifth embodiment differs from the fourth embodiment in the position and arrangement −x of the electric machine 802. The electric machine 802 in the fifth embodiment is turned relative to the electric machine 702 in the fourth embodiment so that the rotor 812 is arranged axially outside the first planetary gear 804. More specifically, the electric, machine 802 change places with the gear shifting device 813 with regard to the first planetary gear 804. The rotor 812 is rotationally rigidly connected to the sun wheel of the first planetary gear 804 via a drive shaft 817. Further, the second set of clutch discs 807 in the gear shifting device 813 connects the rotor 812 of the electric machine 802 via the drive shaft 817 to the drive shaft 836, which is connected to the second planetary gear 806.

Figure 9:
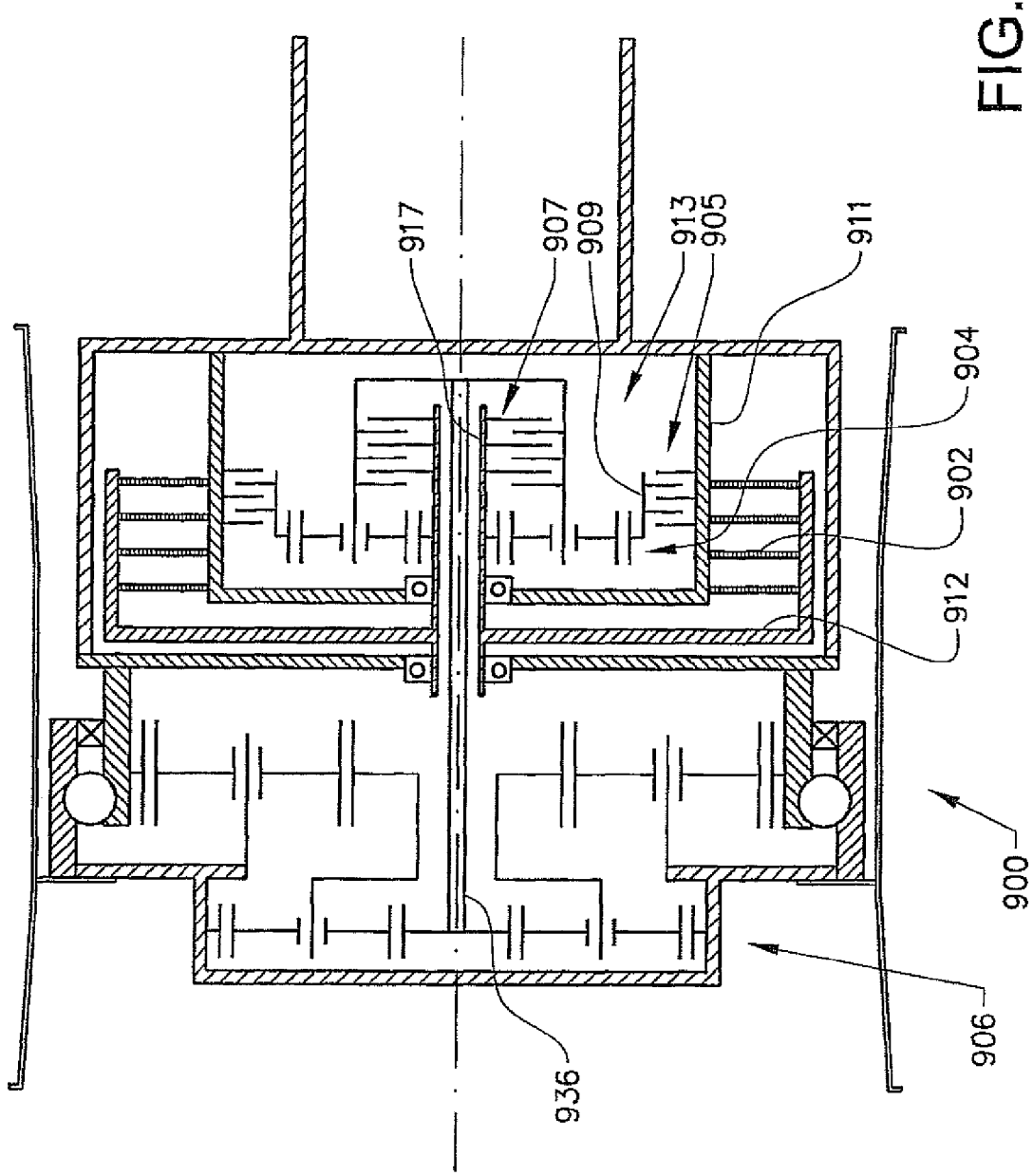

A sixth embodiment of the hub unit 900 is shown in FIG. 9. The sixth embodiment differs from the fourth embodiment in the position and arrangement of the gear shifting device 913. The rotor 912 is rotationally rigidly connected to the sun wheel of the first planetary gear 904 via a tubular shaft 917. A first set of clutch discs 905 in the gear shifting device 913 connects a ring gear 909 to a stationary casing 911. Further, a second set of clutch discs 907 in the gear shifting device 913 connects the rotor 912 of the electric machine 902 via the tubular drive shaft 917 to the drive shaft 936, which is connected to the second planetary gear 906. Thus, the first set of clutch discs 905 forms a brake. In this way, a low gear is achieved when the firs set of clutch discs 905 connects the ring gear 909 to the stationary casing 911. A high gear is achieved when the second set of clutch discs 907 connects the rotor 912 of the electric machine 902 to the drive shaft 936. Any one of the brake alternatives shown in the second and third embodiments is applicable.

One advantage with the feature that the first set of clutch discs 905 forms a brake is that oil pressure and force for application of the clutch can be applied via stationary means. In other words, oil pressure and force does not have to be applied in a rotary manner. A further advantage with the design of the brake 905 is that it creates conditions for carrying a reduced torque.

Figure 10:
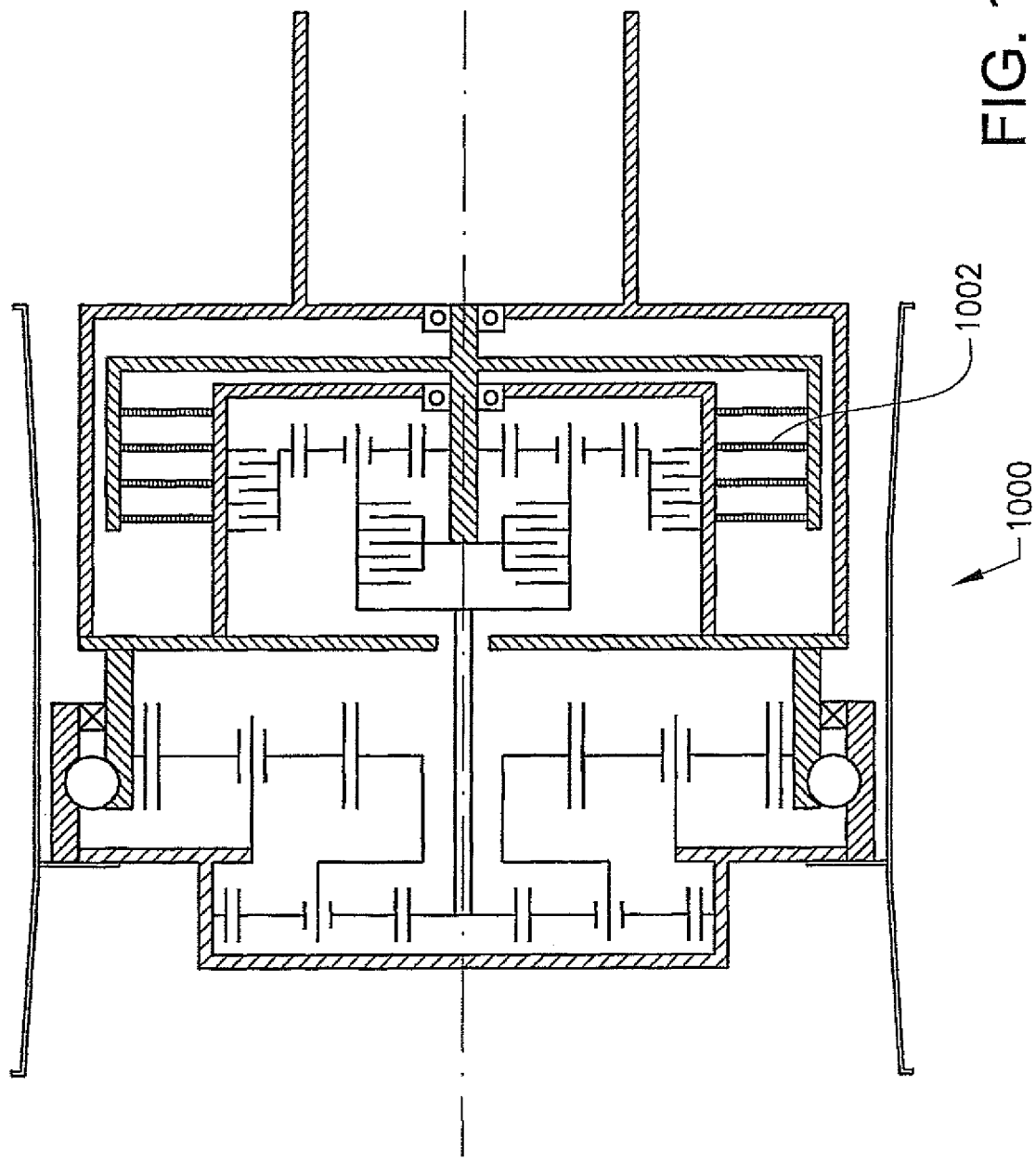

A seventh embodiment of the hub unit 1000 is shown in FIG. 10. The seventh embodiment differs from the sixth embodiment in the position and arrangement of the electric machine 1002. The electric machine 1002 in the seventh embodiment is turned relative to the electric machine 902 in the sixth embodiment in a similar manner as has been described above for the fifth embodiment.

Figure 11:
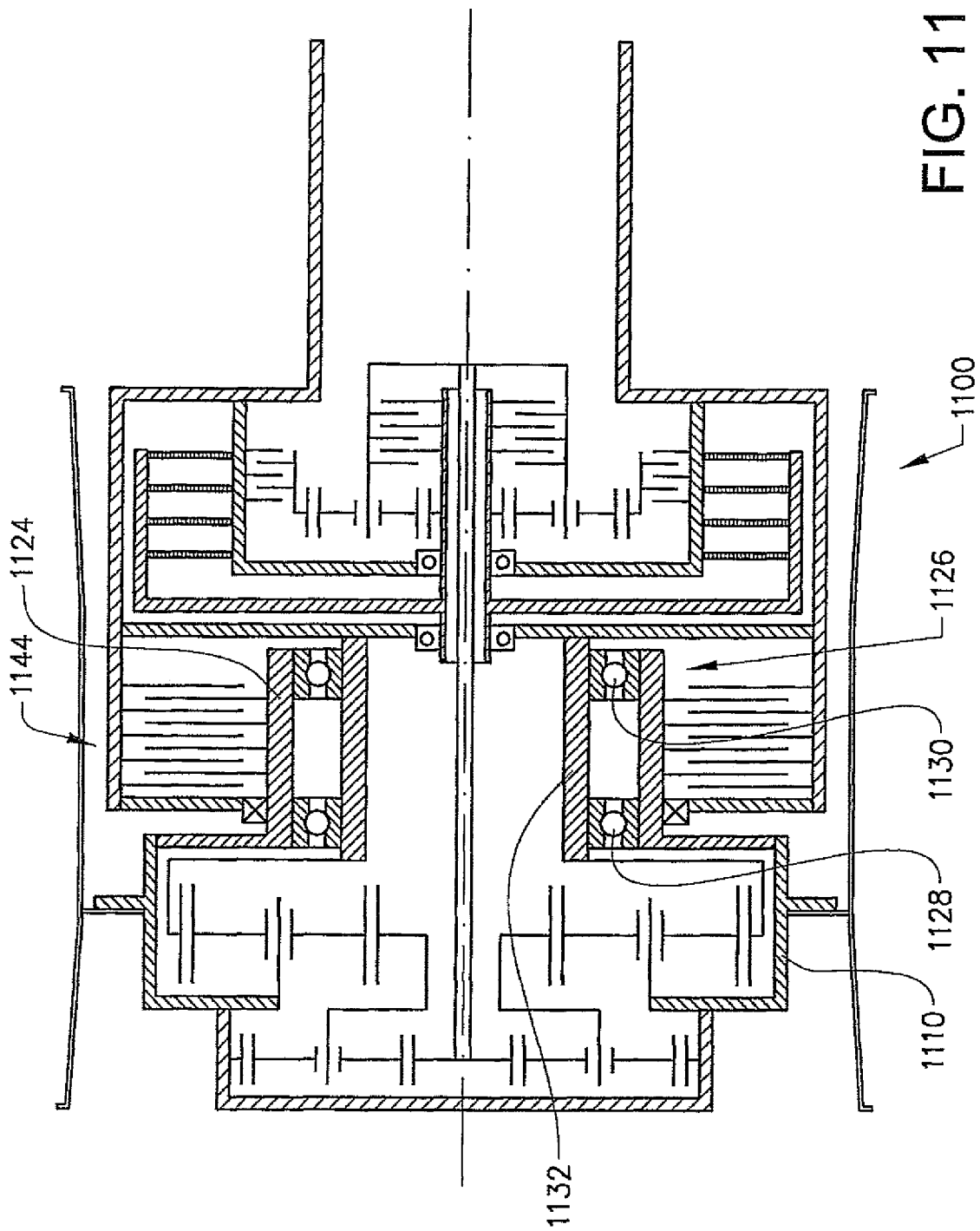

An eighth embodiment of the hub unit 1100 is shown in FIG. 11. The eighth embodiment differs from the sixth embodiment in the bearing arrangement 1126. The bearing arrangement 1126 comprises two axially spaced roller bearings 1128,1130. The wheel hub 1110 is mounted by means of the roller bearings 1128,1130 to a static housing 1132. A wet disc brake 1144 is adapted to brake a part 1124 rotating at wheel speed. More specifically, the wheel speed part 1124 is rotationally rigidly connected to the wheel hub 1110. One advantage with this type of bearing arrangement is that it creates a sufficient space for a wet wheel speed brake.

Figure 12:
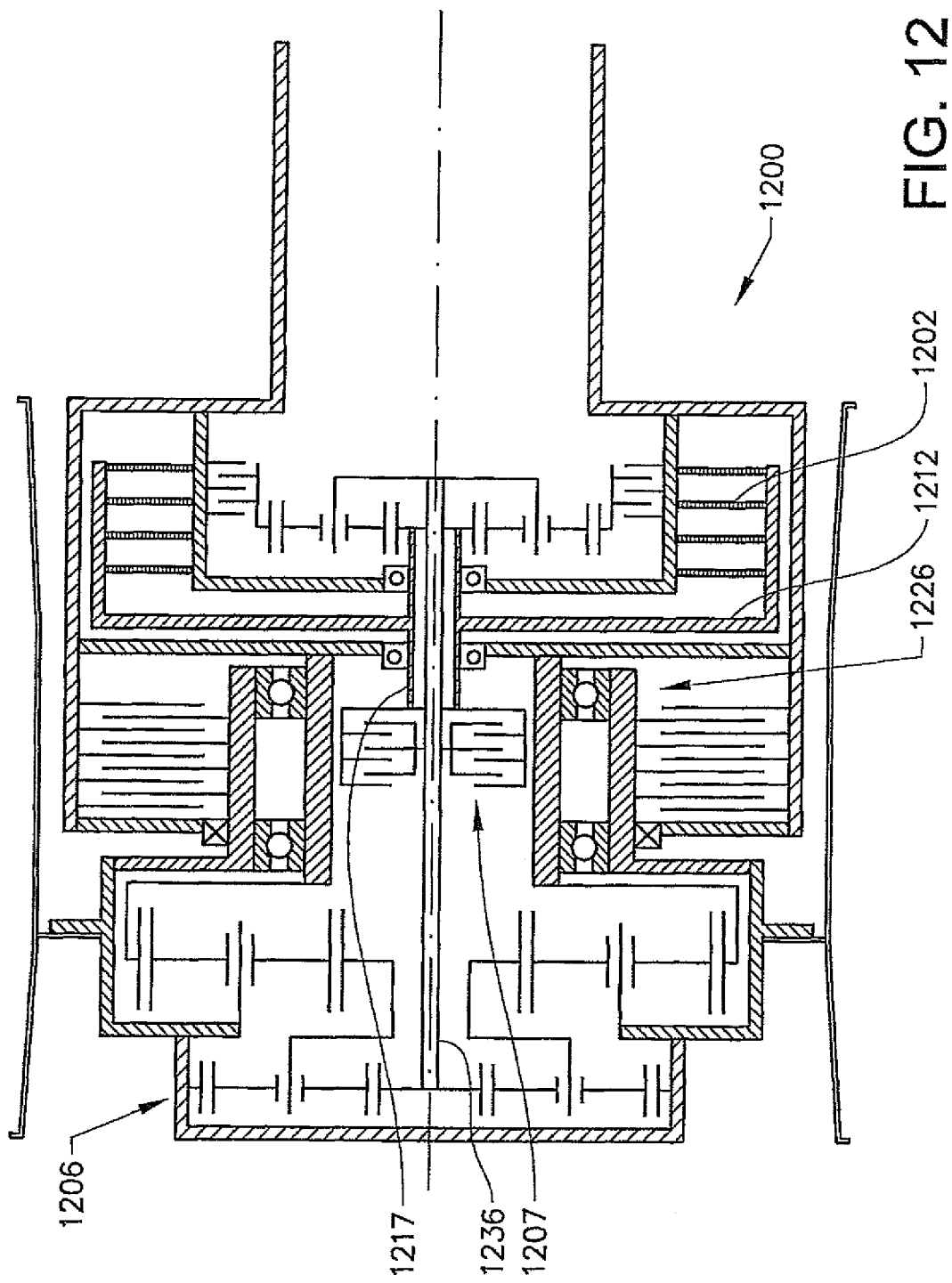

A ninth embodiment of the hub unit 1200 is shown in FIG. 12. The ninth embodiment differs from the eighth embodiment in the position of the second set of clutch discs 1207. The second set of clutch discs 1207 in the gear shifting device connects the rotor 1212 of the electric machine 1202 via a tubular drive shaft 1217 to the drive shall 1236, which is connected to the second planetary gear 1206. The second set of clutch discs 1207 is positioned axially outside the electric machine 1202.

More specifically, the second set of clutch discs 1207 is positioned radially inside the bearing arrangement 1226.

Figure 13:
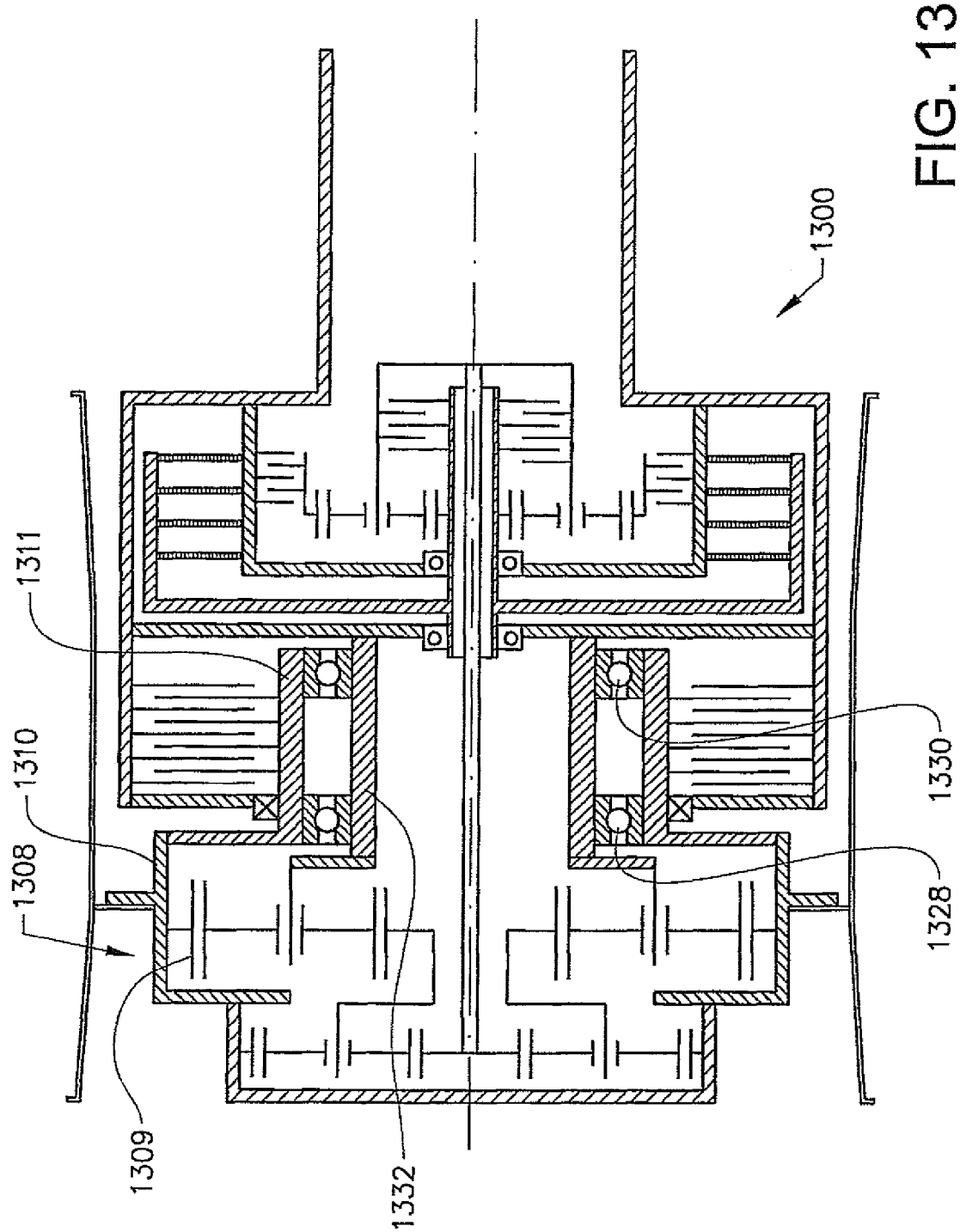

A tenth embodiment of the hub unit 1300 is shown in FIG. 13. The tenth embodiment differs from the eighth embodiment in that a ring gear 1309 of the last (third) planetary gear 1308 is rotationally rigidly connected to the wheel hub 1310 for driving the hub. A planet carrier 1324 of the last planetary gear 1308 is rotationally rigidly connected to a stationary casing 1332. More specifically, the wheel hub 1310 is mounted to the stationary casing 1332 via a pair of axially spaced roller bearings. More specifically, the wheel hub 1310 is rotationally rigidly connected to a tubular part 1311, which is mounted to the stationary casing 1332 via the roller bearings.

According to an alternative to the second embodiment of the hub unit, a first clutch actuating means is arranged for compressing said lust disc set 504 for engagement with the rotor, and a second clutch actuating means is arranged for compressing the second disc set 506 for engagement with the rotor. Thus, the first and second clutch actuating means are in that case arranged to work in opposite direction in order to compress its associated disc set 504,506. By virtue of such a design, the gear shifting device is adapted to achieve a braking effect when both sets of clutch discs engage the rotor at the same time.

For all embodiments of FIGS. 6-13, a braking effect is achieved by application of both clutches at the same time.

It should be pointed out that throughout the application the term "wheels" is meant to comprise vehicle wheels for direct engagement with the ground as well as vehicle wheels for driving a ground engaging member, such as tracks, crawlers or similar.

it is to be understood that the present invention is not limited to the embodiments described above and illustrated in the drawings; rather, the skilled person will recognize that many changes and modifications may be made within the scope of the appended claims.

Furthermore, the electric machine can be used as a brake during a braking operation of the working machine, such as a wheel loader, and at the same time function as a generator for recuperating energy. The energy from the electric power generating motor can be directly supplied to the electric machine and the hydraulic system or stored in the electric energy storage means, such as a battery or super capacitor, to be used later on.

According to an alternative to the embodiments shown in FIGS. 1 and 5, the upstream planetary gear may be arranged axially inwards of the downstream planetary gear. As a consequence, the planetary gears may be arranged so that the power transmission path from the electric machine to the wheel hub extends axially outwards from the electric machine, to the upstream (first) planetary gear, further axially outwards to the second and third planetary gears, and further axially outwards to the wheel hub.

According to an alternative to the bearing arrangement of the hub unit, two wheel bearings (for example roller bearings) may be arranged at an axial distance.

According to an alternative/complement, the brake may be configured to act as a service brake and/or parking, brake.

The invention claimed is:

1. A hub unit comprising an electric machine adapted for driving a wheel, comprising
    at least a first planetary gear coupled in series with a secondary planetary gear between the electric machine and a wheel hub; and
    a gear shifting device from connecting and disconnecting, through the gear shifting device, a planet carrier of the first planetary gear to a drive shaft connected to the second planetary gear,
    wherein a ring gear of first planetary gear is rigidly connected to a stationary casing, wherein the hub unit comprises a gear shifting device for connecting and disconnecting, respectively, a drive shaft of the electric machine to the drive shaft, which is connected to the second planetary gear, wherein the gear shifting device comprises two clutches, which are adapted for selectively rotationally connecting, individually, either one or the other of the planet carrier and the drive shaft of the electric machine to the drive shaft of the second planetary gear.

2. A hub unit according to claim 1, wherein each of the two clutches comprises a set of clutch discs, and the gear shifting device comprises a disc carrier, which is rotationally rigidly connected to the drive shaft of the second planetary gear and carries two sets of clutch discs, wherein one set of clutch discs are adapted for rotationally connecting the planet carrier of the first planetary gear to the drive shaft of the second planetary gear, and wherein the other set of clutch discs are adapted for rotationally connecting the drive shaft of the electric machine to the drive shall of the second planetary gear.

3. A hub unit according to claim 1, wherein a rotor of the electric machine is rotationally rigidly connected to a sun wheel of the first planetary gear via a drive shaft.

4. A hub unit according to claim 1, wherein the first planetary gear is positioned inside a casing of the electric machine.

5. A hub unit comprising an electric machine adapted for driving a wheel, comprising
    at least a first planetary gear coupled in series with a secondary planetary gear between the electric machine and a wheel hub; and
    a gear shifting device for connecting and disconnecting, through the gear shifting device, a planet carrier of the first planetary gear to a drive shaft connected to the second planetary gear,
    wherein a clutch of the gear shifting device is arranged for connecting and disconnecting, respectively, the ring gear of first planetary gear to a stationary casing, wherein the hub unit comprises a gear shifting device for connecting and disconnecting, respectively, a drive shaft of the electric machine to the drive shaft, which is connected to the second planetary gear, wherein the gear shifting device comprises two clutches, which are adapted for selectively rotationally connecting, individually, either one or the other of the planet carrier and the drive shaft of the electric machine to the drive shaft of the second planetary gear.

6. A hub unit according to claim 5, wherein each of the two clutches comprises a set of clutch discs, and the gear shifting device comprises a disc carrier, which is rotationally rigidly connected to the drive shaft of the second planetary gear and carries two sets of clutch discs, wherein one set of clutch discs are adapted for rotationally connecting the planet carrier of the first planetary gear to the drive shaft of the second planetary gear, and wherein the other set of clutch discs are adapted for rotationally connecting the drive shaft of the electric, machine to the drive shaft of the second planetary gear.

7. A hub unit according to claim 5, wherein a rotor of the electric machine is rotationally rigidly connected to a sun wheel of the first planetary gear via a drive shaft.

8. A hub unit according to claim 5, wherein the first planetary gear is positioned inside a casing of the electric machine.

* * * * *